United States Patent [19]

Shiba et al.

[11] Patent Number: 4,737,875

[45] Date of Patent: Apr. 12, 1988

[54] DEVICE FOR PREVENTING OBSTRUCTION BY A TAPE CASSETTE COVER

[75] Inventors: Haruo Shiba; Takateru Satoh; Kimio Tanaka, all of Nagano, Japan

[73] Assignee: TDK Corporation, Japan

[21] Appl. No.: 862,981

[22] Filed: May 14, 1986

[30] Foreign Application Priority Data

May 15, 1985 [JP] Japan ............................. 60-71660[U]

[51] Int. Cl.⁴ .......................................... G11B 23/087
[52] U.S. Cl. .................................................. 360/132
[58] Field of Search ......................... 360/132; 242/198

[56] References Cited

U.S. PATENT DOCUMENTS 4,130,848 12/1978 Amano et al. ..................... 360/132

Primary Examiner—Robert S. Tupper
Attorney, Agent, or Firm—Steinberg & Raskin

[57] ABSTRACT

A magnetic tape cassette including a protective cover pivotally mounted to the front side of a housing is constructed such that damage to the protective cover, resulting from an undesired contact of the cover by positioning pins of the cassette recording/playback apparatus when the positioning pins are inserted into positioning openings of the tape cassette, is prevented by providing cutouts in opposite end corner portions of the elongated planar main portion and arm portions of the cover.

7 Claims, 7 Drawing Sheets

PROIR ART

DEVICE FOR PREVENTING OBSTRUCTION BY A TAPE CASSETTE COVER

BACKGROUND OF THE INVENTION

The present invention relates generally to magnetic tape cassettes of the type used for electromagnetically recording digital signals on magnetic tape and, more particularly, to an improved protective cover resiliently mounted to a front side of the tape cassette for covering a tape access opening at the front side of the cassette for protecting the magnetic tape from contaminants which may enter the tape cassette and compromise tape performance.

Magnetic tape cassettes designed mainly for the recording of analog signals onto magnetic tape are well known. Such tape cassettes are inserted into conventional recording/playback apparatus, such as a cassette tape recorder having a magnetic head which reads the analog signals and converts the same into sound and/or video output signals. On the other hand, floppy discs have been used for recording digital signals. The floppy discs are contained within housings provided with openings by which the floppy disc is accessed by the magnetic head.

However, problems exist in the use of floppy discs. For example, since a shutter which covers the access opening of the floppy disc when it is not in use does not posses,s a locking mechanism, an operator may inadvertently touch the magnetic surface of the floppy disc due to carelessness or inexperience or even may touch the magnetic surface intentionally, thereby leaving fingerprints on the recording surface. The fingerprints may have oil, grease and water deposits which will damage the disc. Moreover, dust, dirt or other contaminants may reach the magnetic surface of the floppy disc through the access opening which will also cause serious problems. It is also well known that the highly flexible nature of the floppy disc requires the operator to handle the same with utmost care.

In an attempt to resolve the problems inherent in the recording and playback of digital signals, a magnetic tape cassette has been proposed for recording digital signals on magnetic tape. The cassette generally comprises a rectangular housing having a tape access opening in its front side. A pair of reels are rotatably mounted in the housing on which magnetic tape is wound for travel from one reel to the other. The tape is guided in its travel past the access opening in the cassette housing during recording and playback. Positioning openings are provided in the cassette which receive positioning pins of the cassette recording/playback apparatus when the cassette is inserted into the apparatus preparatory to use. The cassette also includes a protective cover which covers the length of magnetic tape exposed at the access opening in the front side of the housing when the cassette is not in use to prevent contaminants from entering the opening and adhering to the magnetic tape. The cover is pivoted to the cassette housing for movement from the above-described tape-covering position to an in-use position wherein the cover is pivoted about 90° from its tape-covering position when the cassette is inserted into a slot of the cassette recording/playback apparatus.

However, the conventional construction of the cassette described above has the drawback that as the cassette is ejected from the recording/playback apparatus, the positioning pins are retracted from the positioning openings and the protective cover tends to move into a position where it overlies and obstructs the cassette positioning openings. As the cassette ejection procedure continues, the positioning pins are at least partly reinserted into the positioning openings of the cassette and will strike the protective cover which now overlies the positioning openings which may result in damage to the cover or other problems.

SUMMARY OF THE INVENTION

Accordingly, it is an object of the present invention to provide a new and improved magnetic tape cassette which eliminates the above-described drawbacks and which is capable of preventing the positioning pins of the recording/playback apparatus from striking and damaging the protective cover when the pins are inserted into the positioning openings of the cassette.

Briefly, in accordance with the present invention, this and other objects are attained by providing a tape cassette including (a) a housing having front and rear, lateral and top and bottom sides wherein a pair of positioning openings pass through the top and bottom sides and wherein a respective slit communicates with each respective positioning opening, and wherein a tape access opening is provided in the front side of the cassette housing at which the magnetic tape is exposed, (b) a protective cover pivotally mounted in the slits which is pivotable between a first, tape-covering position wherein the protective cover overlies the tape access opening at the front side of the housing, and a second in-use position wherein the protective cover is remote from the access opening of the cassette housing so as to open the access opening, and (c) nonengagement means for the protective cover which prevent the protective cover from overlying and obstructing the positioning openings of the cassette when the protective cover is positioned in the second position to thereby eliminate the possibility of the positioning pins engaging the cover.

In a preferred embodiment of the invention, the protective cover includes an elongated planar main portion and a pair of arm portions connected to the opposite ends of the elongated planar main portion. The arm portions are arranged in the slits which communicate with the positioning openings and the nonengagement means comprise cutouts formed in the opposite end portions of the elongated planar main portion and the arm portions of the protective cover.

In another preferred embodiment of the invention, the slits are defined by inner and outer side end walls in the front side corners of the housing and the arm portions of the protective cover are arranged in the slits. Each of the arm portions are provided with a pivot shaft pivotally mounted to an inner side end wall through a pivot opening formed therein and which is biased rearwardly by a spring disposed adjacent to the inner side end wall whereby the elongated planar main portion of the protective cover is biased towards the access opening in the front side of the cassette housing when the protective cover is positioned in the first position.

DESCRIPTION OF THE DRAWINGS

A more complete appreciation of the present invention and many of the attendant advantages thereof will be readily understood by reference to the following detailed description when considered in connection with the accompanying drawings in which.

DETAILED DESCRIPTION OF THE PREFERRED EMBODIMENTS

Figure 1:
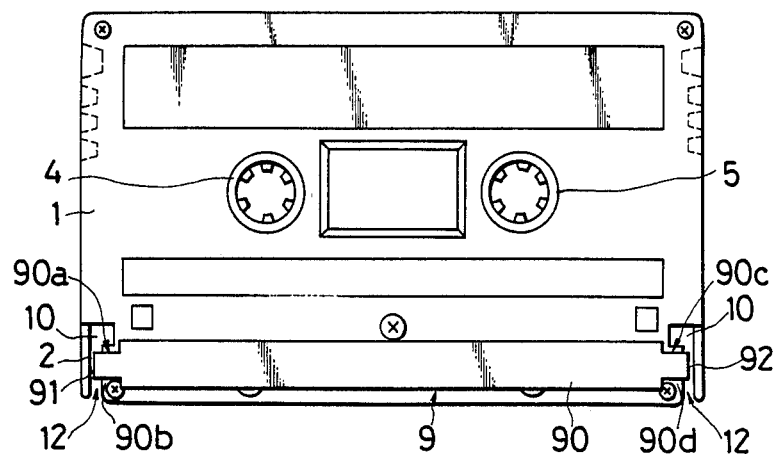
FIG. 1 is a top plan view of a magnetic tape cassette in accordance with the present invention in which the protective cover is in a second or open or in-use position.
Figure 2:
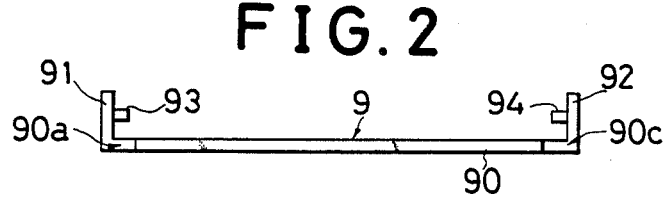
FIG. 2 is a top plan view of the protective cover of the cassette illustrated in FIG. 1.
Figure 3:
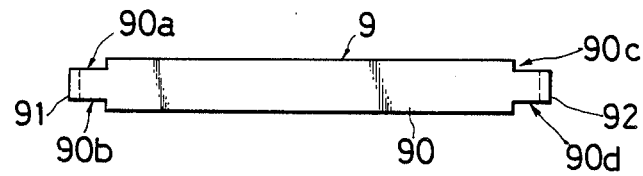
FIG. 3 is a front view of the protective cover of FIG. 2.
Figure 4:
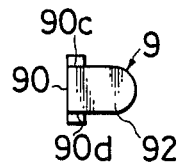
FIG. 4 is side view of the protective cover of FIG. 2.

Referring now to the drawings wherein like reference characters designate identical or corresponding parts throughout the several views, a conventional prior art magnetic tape cassette will be described with reference to FIGS. 7-16. The cassette housing comprises an upper rectangular casing 1 and a lower rectangular casing 2 molded of appropriate synthetic resin material. The upper and lower casings 1 and 2 are joined together to form the cassette housing which has an access opening 100 at its front side. Magnetic tape 3 is mounted in the interior of the housing for travel between a pair of rotatably mounted reels 4 and 5. In particular, the magnetic tape 3 is wound around reel 4 and is advanced over guide roller 6, a tape pad 7, a subsequent guide roller 8 and then onto the other reel 5 in a conventional manner. The tape 3 is advanced in a taut condition past the access opening 100 of the front side of the cassette housing during recording/playback operations.

The cassette housing is provided with a protective cover 9 for covering the run of the magnetic tape 3 which is exposed at the access opening 100 of the front side of the cassette housing. The cover 9 is pivotally mounted on the housing for movement between a first, closed position (FIGS. 7-9) in which the cover 9 overlies the tape 3 at the front side of the housing and a second open or in-use position (FIGS. 12 and 13) wherein the cover 9 is pivoted over about a 90° angle from the first position to a second, in-use position remote from the tape 3 at access opening 100 to provide access thereto for the recording/playback heads. In the first, closed position, the protective cover 9 prevents dust, dirt and other contaminants, as well as the operator's fingers, from entering the access opening 100 at the front side of the housing and contacting the magnetic tape 3. The contaminants problem is quite serious in the case of digital signal recording because the digital signals are recorded over much smaller lengths of the tape compared to the case of analog signal recording. In other words, digital signals have a higher recording density than analog signals so that it is even more important to take appropriate measures to prevent contaminants, such as fingerprints, from contacting the magnetic tape 3 in the case of recording digital signals.

The protective cover 9 is preferably formed of suitable synthetic resin material and has an elongated planar main portion 90 for covering the run of the tape 3 exposed along the length of the access opening 100 at the front side of the cassette housing. A pair of arm portions 91 and 9 extend substantially perpendicularly from the main portion 90 at its opposite ends. A pair of pivot or stub shafts 93 and 94 are provided within the interior of the cassette housing and pass through respective arm portions 91 and 92 of the protective cover 9. The pivot shafts 93 and 94 are colinearly aligned along a pivot axis around which the protective cover 9 pivots in either circumferential direction.

Figure 7:
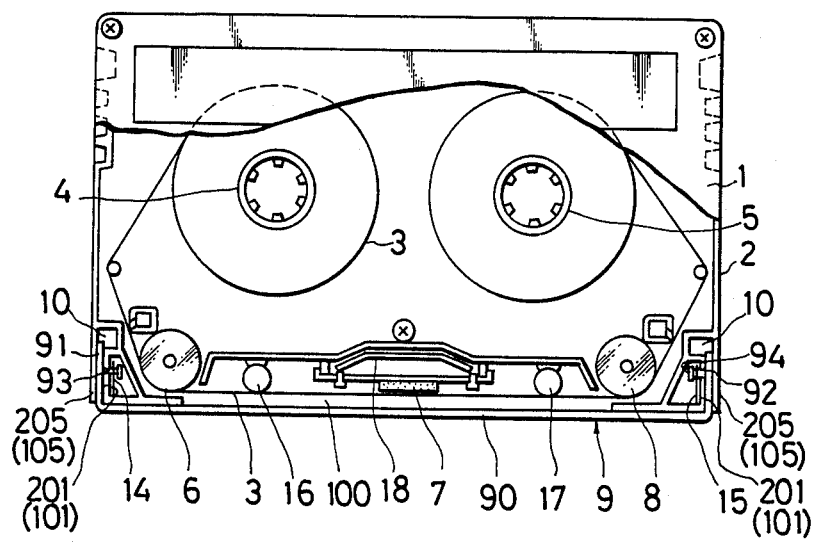
FIG. 7 is a top plan view, partially broken away, of a conventional prior art magnetic tape cassette in which the protective cover is in a first or closed or tape-covering position.
Figure 8:
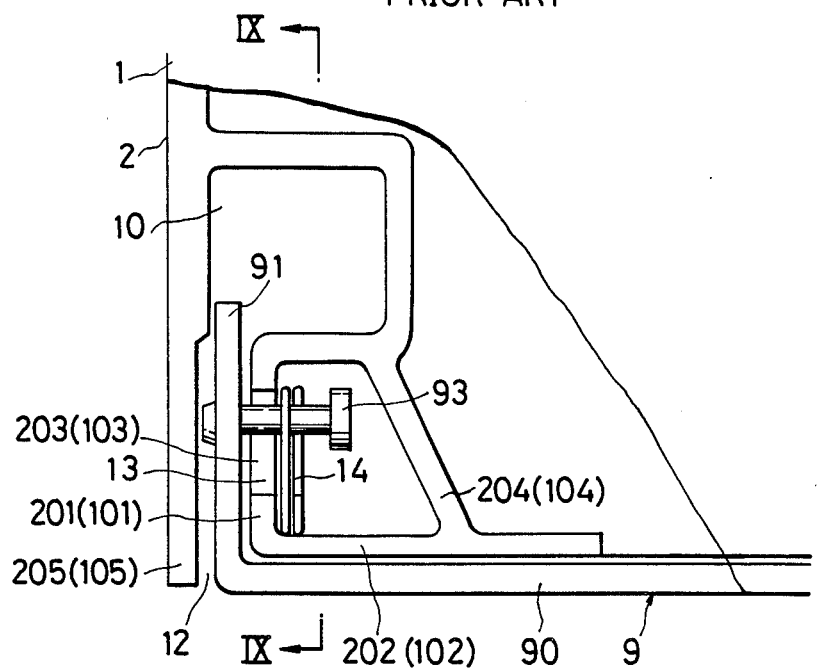
FIG. 8 is an enlarged fragmentary top plan view, partially broken away, of the left front side of the prior art tape cassette shown in FIG. 7.
Figure 9:
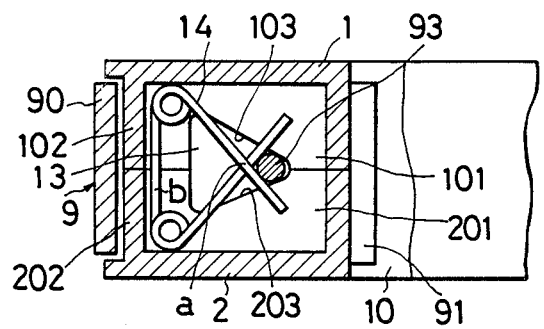
FIG. 9 is a section view taken along line IX—IX of FIG. 8.

Still referring to FIGS. 7-9, the upper and lower casings 1 and 2 respectively include at each of their front side corners structure which define upon assembly of the upper and lower casings an inner side end housing wall 101;201, a front end housing wall 102; 202 extending perpendicularly from the inner side end housing wall 101;201, and an outer side end housing wall 105;205 substantially parallel to the inner side end housing wall 101;201. The access opening 100 is defined between the ends of the left and right front end walls 102;202 at the front side of the cassette housing.

As seen in FIGS. 8 and 9, a pair of positioning openings 10 (only one shown) are formed through the cassette housing, through which a pair of positioning pins 11 (FIGS. 10 and 11) of a recording/playback apparatus, such as a cassette tape recorder, are inserted for positioning the tape cassette when the cassette is inserted into the apparatus preparatory to use. The positioning openings 10 are arranged at the left and right front side end portions of the upper and lower casings 1 and 2 and pass through the upper and lower surfaces thereof in the direction of thickness of the cassette housing. Each of the positioning holes 10 communicates with the front side of the cassette housing at its outer front side corner by way of a narrow space or slit 12 defined between the inner front side end housing wall 101;201 and the outer front side end housing wall 105; 205.

The stub shafts 93 and 94 of the protective cover 9 are each mounted to a respective inner front side end housing wall 101;201 through relatively large triangularly-shaped pivot holes 13 which are defined by pairs of triangular notches 103 and 203 formed by cutting out abutting portions of the inner front side end housing walls 101 and 201 of the upper and lower casings 1 and 2. Substantial clearance is provided for each of the stub shafts 93 and 94 in respective pivot holes 13 so that the shafts 93 and 94 can freely move in their respective pivot holes both in the circumferential direction around the pivot axis defined by the stub shafts 93 and 94 as well as in either transverse direction, i.e., toward and away from the front end housing wall 102;202.

A pair of double-armed triangularly-shaped springs 14 and 15 bias the stub shafts 93 and 94 in the rearward direction and thereby bias the main portion 90 of the protective cover 9 toward the cassette housing as best seen in FIGS. 8 and 9. In this manner, the springs 14 and 15 act to determine both the first, covered and second, open or inuse positions of the protective cover 9 through resilient engagement with the stub shafts 93 and 94 to which the cover 9 is connected. Each of the springs 14 and 15 comprises an intermediate base portion b and a pair of crossed free arm portions a connected to the opposite ends of the base portion b via looped coils best seen in FIG. 9. The base portion b of each of the springs 14 and 15 is urged against the front end housing wall 101;202 and the upper and lower walls of the upper and lower casings 1 and 2. Each of the stub shafts 93 and 94 engage the free arm portions a at their point of intersection and these spring arm portions resiliently urge the respective stub shafts 93 and 94 which pass through the triangular pivot holes 13 of the inner front side end housing walls 101;201 rearwardly away from the spring base portion b thereby urging the protective cover 9 rearwardly in both the first covered and second exposed or in-use positions thereof.

It will be understood that other means may be used for urging the protective cover 9 rearwardly than the triangularly-shaped springs 14 and 15 illustrated in the preferred embodiment. For example, leaf springs comprising a thin metal plate, such as stainless steel or phosphor bronze, may be used for biasing the stub shafts 93 and 94 in a rearward direction.

Referring to FIG. 7, a pair of holes 16 and 17 are provided at the front side portion of the housing through which a capstan drive shaft and a pinch roller shaft are received when the cassette housing is inserted into the recording/playback apparatus. A shield plate 18 is disposed in the middle of the front side portion of the cassette housing at the rear of the tape pad 7.

When the tape cassette is not in use, as shown in FIG. 7-9, the protective cover 9 completely covers the access opening 100 at the front side of the housing to thereby eliminate any possibility that the operator's fingers and will enter into the cassette into contact with the magnetic tape 3 therein thereby preventing decreased performance of the magnetic tape or other more serious consequences. In the non-use position of the protective cover 9, the free ends of the arm portions 91 and 92 of the protective cover 9 partly enter into the positioning openings 10 as best seen in FIG. 8.

Figure 10:
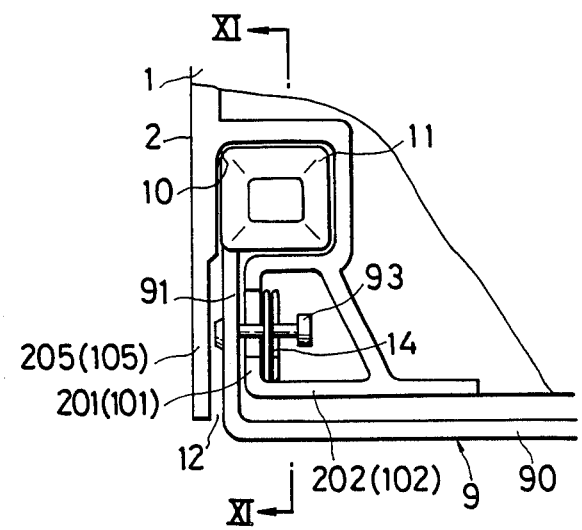
FIG. 10 is an enlarged fragmentary top plan view, similar to FIG. 8, of the prior art magnetic tape cassette inserted in recording/playback apparatus and illustrating the protective cover in an intermediate position situated forwardly of the first, covering position.
Figure 11:
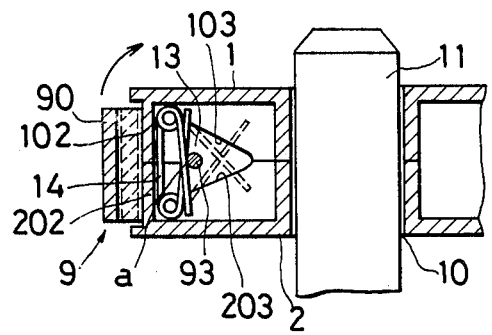
FIG. 11 is a section view taken along line XI—XI of FIG. 10.
Figure 12:
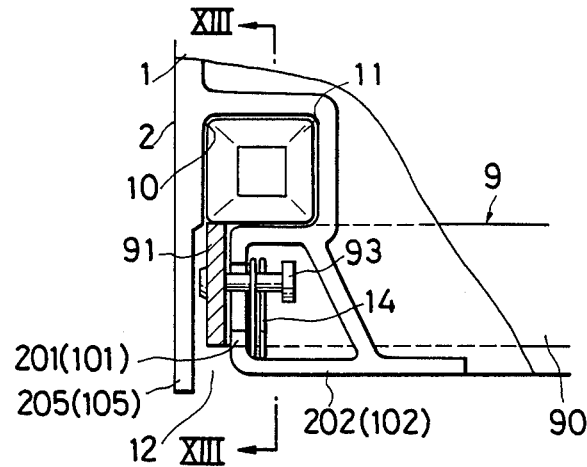
FIG. 12 is an enlarged fragmentary top plan view, similar to FIG. 8, of the prior art magnetic tape cassette inserted in recording/playback apparatus and illustrating the protective cover in a second, in-use position.
Figure 13:
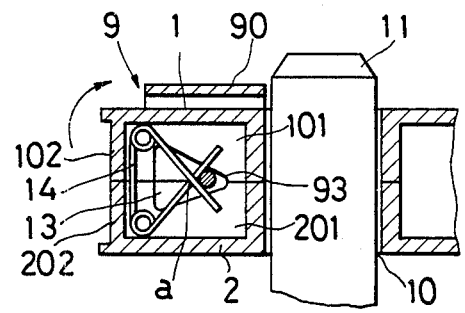
FIG. 13 is a section view taken along line XIII—XIII of FIG. 12.

When it is desired to use the tape cassette, the cassette is inserted into a slot of the cassette playback/recording apparatus whereupon positioning pins 11 of the apparatus are inserted into the positioning openings 10 as seen in FIGS. 10 and 11. As the positioning pins 11 are inserted into the positioning openings 10, the pins 11 push the free ends of the arm portions 91 and 92 of cover 9 axially forwardly so that the main portion 90 of cover 9 is moved forwardly a small amount to attain an intermediate position spaced from the front end housing wall 102;202 of the cassette housing as best seen in FIG. 11. When the main portion 90 of cover 9 reaches the intermediate position shown in solid lines in FIGS. 11, being pushed thereto by the positioning pins 11 against the force of springs 14 and 15, the cover 9 is capable of pivoting over a substantially 90o angle as seen in FIGS. 12 and 13 to expose the magnetic tape 3 at the access opening 100 defined in the front end housing wall 102;202 of the front side of the housing. Recording and/or playback of the cassette tape can then commence.

After recording or playback is completed, the tape cassette is automatically ejected from the recording/playback apparatus. In particular, firstly, the positioning pins 11 are retracted from the positioning openings 10 whereupon the protective cover 9 is pivoted over 90° to again cover the access opening 100 at the front end housing wall 102;202 of the front side of the housing.

Figures 14, 15, 16:
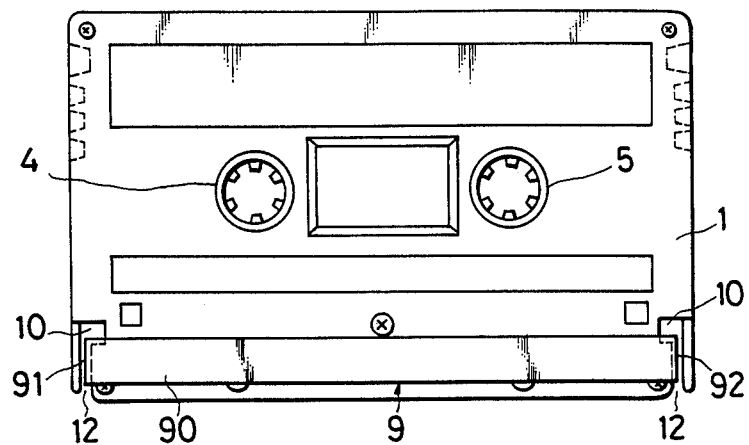
FIG. 14 is a top plan view of the prior art magnetic tape cassette of FIG. 7 wherein the protective cover is in the second, in-use position.
FIG. 15 is an enlarged fragmentary top plan view of the left front side of the tape cassette of FIG. 14.
FIG. 16 is a section view taken along line XVI—XVI of FIG. 15.

However, a problem arises during this procedure. For example, before the tape cassette is fully withdrawn from the playback/recording apparatus and after the positioning pins 11 have been initially withdrawn from positioning openings 10, the tape cassette is repositioned so that the pins 11 are again inserted into the positioning openings 10. However, the cover 9 has not as yet returned to the first, covering position at the front side of the housing and a part of the cover 9, which is biased rearwardly by springs 14 and 15, partially obstructs and closes the positioning holes 10 in the path of the positioning pins 11 as seen in FIGS. 14–16. More particularly, when the protective cover 9 is initially moved from the first covering position to the second in-use position, the main portion 90 and the arm portions 91 and 92 of the cover 9 engage the pins 11 as seen in FIGS. 12 and 13 which thereby prevents the main portion 90 of the cover 9 from obstructing the positioning openings 10. However, upon commencing the tape cassette ejecting operation in order to withdraw the cassette from the recording/playback apparatus, the positioning pins 11 are initially completely retracted from the positioning openings 10 whereupon the springs 14 and 15 urge the cover 9 rearwardly so that the main portion 90 of the cover 9 partially overlaps the positioning openings 10 by a distance W1 as seen in FIGS. 15 and 16. Accordingly, when the tape cassette is repositioned during the course of the cassette ejecting operation so that the positioning pins 11 are reinserted into the positioning openings 10 as shown in FIGS. 15 and 16, the positioning pins 11 will strike the main portion 90 of cover 9. This may cause damage to the cover 9. Moreover, the engagement of the main cover portion 90 by the positioning pins 11 may result in material being ground from the main cover portion 90 or may even cause the inner surfaces of the triangular pivot holes 13 to be ground so that ground powder is deposited within the interior of the cassette housing. In order to prevent the powder from spreading further into the housing, walls 104;204 (FIG. 8) are provided at the front side corners of the housing. However, the ground material still tends to enter into the main portion of the cassette interior.

Although the problem could be solved by moving the stub shafts 93 and 94 forwardly, this is not practical since the mounting positions of the pivot shafts of the cover 9 and the locus of pivoting of the cover 9 are fixed by various requirements for standardization.

Referring now to FIGS. 1-6, a magnetic tape cassette in accordance with the present invention will now be described. The same reference numerals are used to designate identical or corresponding parts as used in connection with the prior art cassette.

Figure 5:
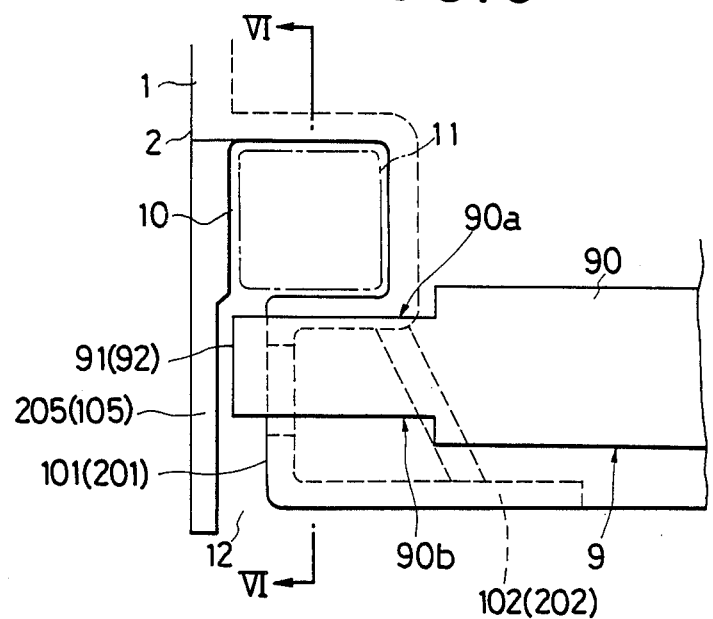
FIG. 5 is an enlarged fragmentary top plan view of the left front side quarter of the magnetic tape cassette of FIG. 1.

A magnetic tape cassette in accordance with the invention comprises upper and lower rectangular casings 1 and 2 which are joined together to form a cassette housing, and a protective cover 9 is pivotally mounted to the front side of the housing. The protective cover 9 comprises an elongated planar main portion 90 and a pair of arm portions 91 and 92 connected to opposite ends of the main portion 90 and extending perpendicularly thereto. Four cutouts 90a, 90b, 90c and 90d are formed in the upper and lower corners of the opposite end portions of the main cover portion 90 and the upper and lower sides of the arm portions 91 and 92. The width of each cutout 90a, 90b, 90c and 90d is determined so that no part of either the main cover portion 90 or the arm portions 91 and 92 of the protective cover 9 overlie and obstruct the positioning openings 10 so as to block the path of the positioning pins 11 when the cover 9 is pivoted from the first position at the front side of the housing to the second, in-use position. The cutouts are formed so that the positioning openings 10 will not be obstructed regardless of whether the protective cover 9 is pivoted upwardly or downwardly through the 90° angle as shown in FIGS. 5 and 6.

Figure 6:
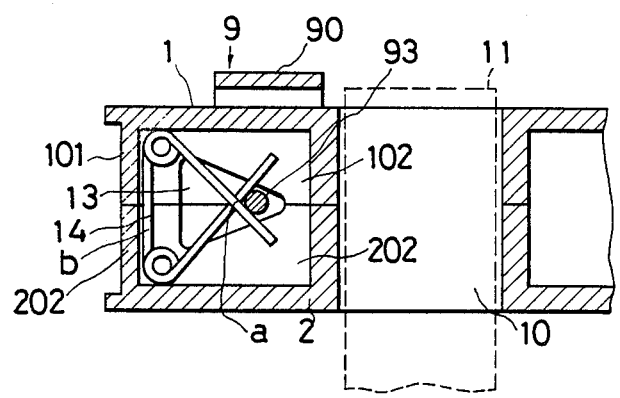
FIG. 6 is a section view taken along line VI—VI of FIG. 5.

Accordingly, as best seen in FIG. 6, the positioning pins 11 will never contact the main portion 90 or the arm portions 91 and 92 of the protective cover 9, even when the protective cover 9 is in its second, in-use position and regardless of whether the main portion 90 is located adjacent to the upper or to the lower surface of the cassette housing. The positioning pins will likewise never contact the arm portions of the cover 9. As a result, any possibility of damage or breakage of the protective cover 9 or abrasion of the material of protective cover 9 by the positioning pins 11 is eliminated.

It should also be noted that in accordance with the illustrated embodiment of the invention, the positions of the pivot or stub shafts 93 and 94 for cover 9 are the same as in the case of the conventional prior art cassette so that the standardization requirements are satisfied. Additionally, in the illustrated embodiment, the cutouts 90a-90d are formed in the opposite end portions of the main portion 90 and the arm portions 91 and 92 of cover 9 and do not extend inwardly beyond the inner ends of the front end wall 102;202 of the cassette housing. As a result, the main portion 90 of cover 9 completely covers the access opening 100 of the front side of the housing in the same manner as in the conventional cassette when the cover 9 is positioned in the first position. Accordingly, the invention does not affect the operation of the protective cover 9 with respect to its primary function, namely, the protection of the run of the magnetic tape which passes the access opening 100.

It is seen from the foregoing that in accordance with the invention, a magnetic tape cassette is provided which is capable of preventing damage to the protective cover or abrasion of the material of the protective cover and/or of the pivot shaft-receiving openings which are caused by the positioning pins contacting the cover as the pins are inserted into the positioning openings. This is accomplished by providing the cutouts described above in the upper and lower opposite end corner portions of the main portion and the arm portions of the cover for eliminating the possibility of the cover obstructively engaging the positioning openings and the consequent engagement of the cover by the positioning pins which are inserted into the positioning openings.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. A magnetic tape cassette, comprising:
   a housing having front, rear, top, bottom and lateral side walls, a pair of positioning openings passing through said top and bottom walls, each of said positioning openings communicating with a respective forwardly extending slit that opens onto said front housing wall, and a tape access opening provided in said front wall at which a run of magnetic tape is exposed;
   a protective cover pivotally mounted to said housing through said slits, said cover being pivotable between a first position at which the protective cover overlies said access opening and a second position at which the protective cover is remote from said access opening in said front housing wall;
   wherein said protective cover includes non-engagement means for providing that no part of said protective cover overlies and obstructs said positioning openings when said cover is in said second position; and
   wherein said protective cover comprises an elongated planar main portion and pair of arm portions connected to opposite end portions of said planar main portion, each of said arm portions extending through a respective one of said slits, and wherein said nonengagement means include cutouts formed in said opposite end portions of said elongated planar main portion and said arm portions of said protective cover.

2. The combination of claim 1, wherein said protective cover is pivotally mounted to pivot in a direction substantially parallel to planes of said lateral side walls.

3. The combination of claim 1 wherein each of said slits is defined by an inner and an outer side end wall at a respective one of front corners of said housing, said arm portions extending through said slits, each of said arm portions being provided with a pivot shaft which is pivotally mounted to a respective one of said inner end walls through a pivot hole formed therein, biasing means for urging each of said pivot shafts in a rearward direction to thereby urge said elongated planar main portion of said protective cover towards said access opening when said protective cover is in said first position, said biasing means being situated adjacent a respective one of said inner side end walls.

4. The combination of claim 3, wherein said biasing means comprise a pair of springs, each spring comprising an intermediate base portion urged against said front housing wall and a pair of crossed free arm portions connected to opposite ends of said base portion and engaging a respective pivot shaft at a point of intersection thereof and urging the same in a rearward direction away from said base portion.

5. The combination of claim 4, wherein each said pivot hole is substantially triangularly shaped with an apex thereof pointing in a direction away from said front housing wall.

6. The combination of claim 3, wherein said pivot shafts each extend in a direction substantially parallel to said front end wall and substantially perpendicular to said lateral side walls.

7. The combination of claim 1, wherein each said slit is of narrower width than said respective positioning opening with which said slit communicates.

* * * * *